Patented May 6, 1952

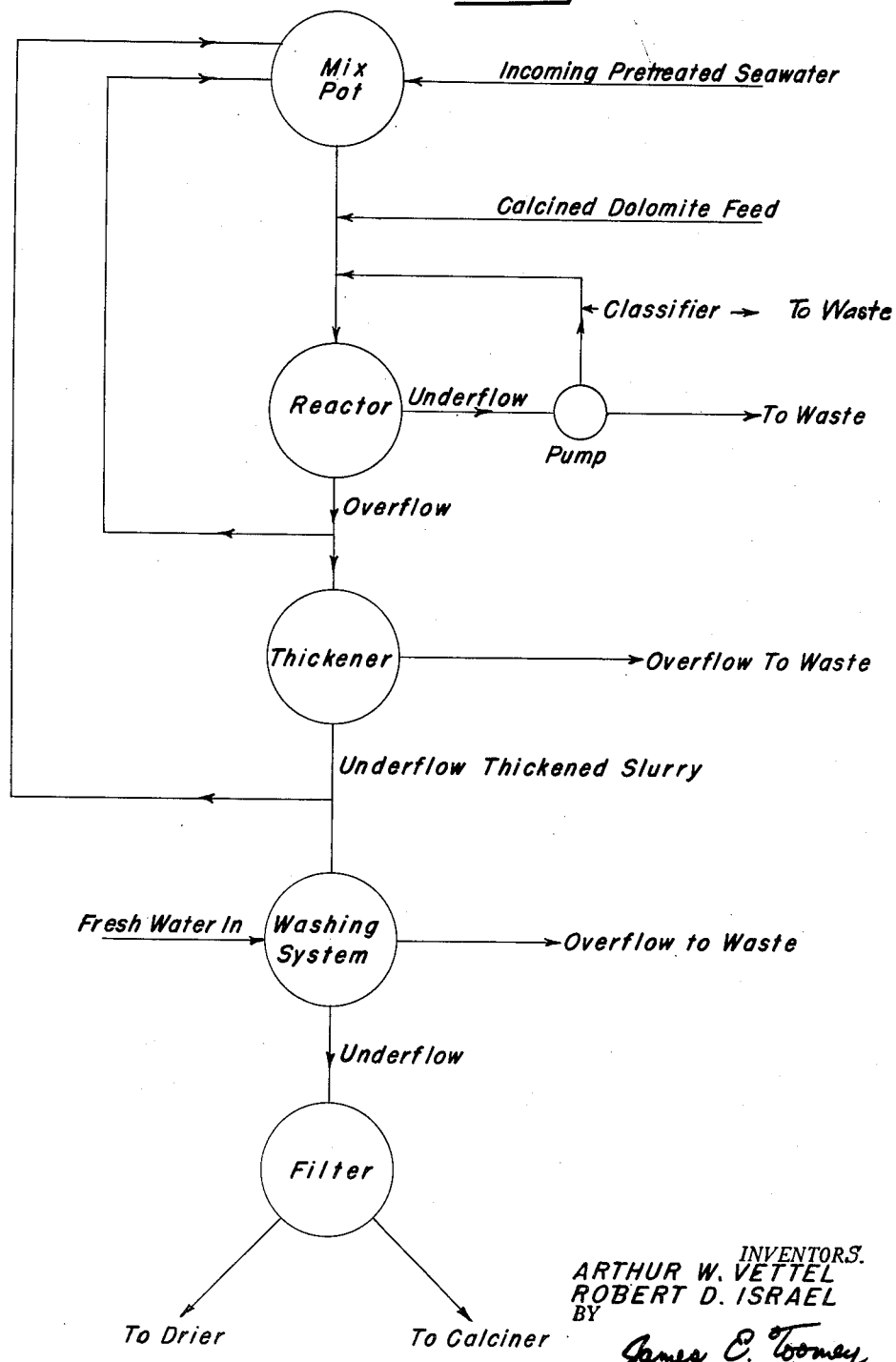

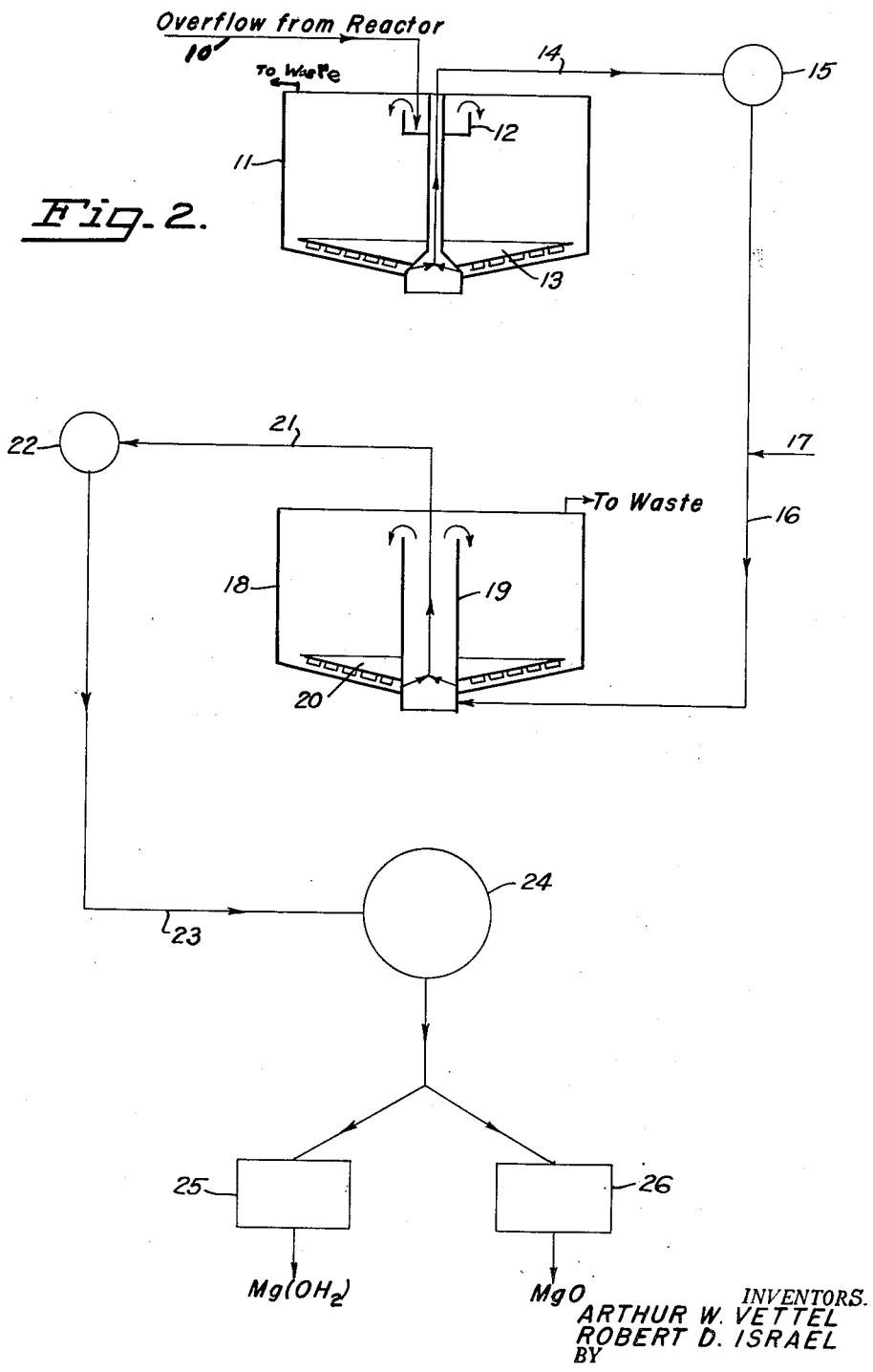

2,595,314

UNITED STATES PATENT OFFICE 2,595,314

PROCESS FOR PRODUCING MAGNESIUM HYDROXIDE

Arthur W. Vettel and Robert D. Israel, Watsonville, Calif., assignors to Kaiser Aluminum & Chemical Corporation, a corporation of Delaware Application October 19, 1948, Serial No. 55,352

11 Claims. (Cl. 23—201)

This invention relates to the production of magnesium hydroxide by precipitation thereof from dilute magnesium salt solutions such as sea water.

Sea water contains magnesium salts in significant quantities and is, therefore, an almost inexhaustible source of magnesium values, such as magnesium hydroxide and of magnesia. It has not been utilized as such source until very recent times, however, because of the costs of processing such a dilute solution and because of difficulties in obtaining dense and well-crystallized precipitates. A number of processes have been proposed to overcome these difficulties and to produce a purer product.

Early workers in this field proposed adding powdered dry reagent to the sea water and then recovering all of the separated solids. This technique was later generally discarded in favor of reacting the sea water with slurries or hydrates of lime or calcined dolomite because it was believed that the dry reagent was not sufficiently reactive. However, certain workers in this field did retain the feature of adding lime or calcined dolomite in the dry state and in a preferred particle size range, that is, ground or comminuted to pass about a 20-mesh screen (U. S. Bureau of Standards) and to be retained on a 100-mesh screen, or a 200-mesh screen. It had appeared that the settling rate of the magnesium hydroxide reached an optimum within these particle size ranges, and that the purity of the product was fairly high. However, the density of the magnesium hydroxide precipitate was still fairly low. Other processes of increasing the settling rates and density of the precipitate have included maintaining large inventories of seed crystals in the reactor.

It has now been found that a magnesium hydroxide precipitate of still greater density, of excellent settling and filtering characteristics, and of high purity, is obtained by admixing sea water, or dilute magnesium salt solution, with spent sea water or solution from a previous treatment, and a proportion of magnesium hydroxide seed crystals, adding calcined dolomite to the mixture, agitating the mixture in a reaction zone, withdrawing from the base of the zone an underflow which is enriched in impurities, and withdrawing an overflow which is a suspension of magnesium hydroxide in spent sea water or solution. The heavier underflow is drawn off from the bottom of the reaction zone and is preferably recycled to the system. The major portion of the impurities, comprising especially silica, iron oxide, alumina and lime, as such or combined, are found to be in the settled underflow and are preferably removed at intervals. That is, the settled underflow is recycled to react further amounts of lime and to add its hydrated magnesia content to the production system, and about once in 24 hours, for example, the settled material is withdrawn to waste. Depending upon the analysis of a sample of the settled material, it can be withdrawn more or less often. Alternatively, a portion of the settled material can be continuously withdrawn to waste. As the lime content of this material becomes used up in the reaction and the magnesia content is largely drawn into the production system, the concentration of the afore-mentioned impurities increases in the underflow and the impurities are, therefore, largely removed as the spent material goes to waste. For convenience this invention will be described with reference to sea water, but it is to be understood that the description applies to equivalent dilute brines or solutions.

The incoming sea water is diluted with spent sea water from a previous treatment, which reduces the concentration of magnesium ion in the reaction zone and therefore is believed to decrease the formation of new nuclei, favoring deposition of newly precipitated $Mg(OH)_2$ on the crystal surfaces provided. It is generally preferred in practice to add the diluting liquid in an amount of from about one-half to one and one-half times the volume, or the rate of flow, of the incoming solution. Excellent results are obtained when the diluting liquid is added in an amount about equal to that of the incoming solution. At least about one-half the volume of sea water or solution should be added to obtain a significant improvement in the character of the precipitate formed. About 2 times the volume of incoming sea water can be added but more than this is not economical or especially advantageous. Spent sea water, as described, is the preferred dilution liquor in most instances because this maintains a constant magnesium ion concentration and has other advantages. However, fresh water as dilution liquid may be desirable in specific operations for special objectives, for instance, where it is desired to obtain a magnesia substantially free of boron. Spent sea water or spent (diluting) liquid in sea water or equivalent dilute solution which has been previously treated according to the process and which still contains about 10–20% of its original magnesium ion content.

The incoming sea water is also mixed with an amount of seed crystals of magnesium hydroxide which may be very finely divided naturally-occurring material or magnesium hydroxide from another source, but which is preferably magnesium hydroxide previously precipitated in this same process. For instance, it is advantageous to recycle to the incoming sea water a portion of the thick slurry withdrawn from one of the thickeners which are in series with the reaction vessel or tank. The amount of seed crystals provided should be at least 300% of the amount of magnesium hydroxide being precipitated in the reaction zone, or should be in a ratio of from at least about 3:1 to about 15:1 therewith. The amount of seed crystals, however, is preferably about between 3:1 and 10:1, if a very highly purified product be desired, because as the concentration of magnesium hydroxide crystals in the reaction zone increases above the amount which would be present with the addition of this amount of seed, it is found that the amount of silica and/or other impurities carried out of the reactor with the product becomes higher. At a ratio exceeding 15:1, the amount of impurities is undesirably high. An especially advantageous practice in a continuous process is to provide part, for example, about half of the seed crystals by recycling underflow from the thickener and the remainder by recycling overflow from the reactor, because this practice maintains the desired settling and thickening conditions in the thickener and also increases the effective retention time in the reactor.

The reactant added to the sea water mixture is calcined dolomite. It can be added as a ground material of particle size, passing 20-mesh and not less than retained on 200-mesh (U. S. Bureau of Standards screen), and of the particle sizes within this limit, those particle sizes which are in major proportion between 48 and 100-mesh provide the most rapidly settling precipitate. It has been found, however, to be particularly advantageous to add dolomite as it comes from the calcining kiln and without further grinding. That is, the dolomite rock is crushed and then calcined. The calcined product is added to the sea water mixture without grinding, and it has been found that this leaves the impurities, such as granite or other siliceous rock and the like, in larger pieces which fall to the base of the reaction zone and are removed as will be more fully described below. The dolomite material becomes more finely divided during calcining and a very small proportion of it may go as low as a size to pass 65-mesh, but predominantly it is retained on 35-mesh. The dolomite is, for example, crushed to pass ¾-inch mesh and is calcined. The calcined material is somewhat smaller, but only about 10% passes through 35 mesh. the remaining 90% being coarser than 35 mesh.

The dolomite is added in such proportion to the incoming sea water that all of its lime content can be reacted. It is preferably added in an amount to react only from about 80% to about 90% of the available magnesium ion of the sea water, although more can be added, if desired. The sea water mixture with added dolomite is agitated in a reaction zone at such a rate that good mixing is obtained while, at the same time, the dolomite particles settle through the mixture and are withdrawn at the base of the reaction zone. The settled dolomite particles contain a diminished concentration of lime and magnesia and a correspondingly increased concentration of the impurities as described above. The settled dolomite particles are suitably returned to the reaction zone to continue the reaction of their residual lime content. A portion of these settled particles can be continuously withdrawn to waste to remove impurities, but alternatively the reacted particles are totally withdrawn at suitable intervals. The rejects are withdrawn when the density of the material at the base of the reactor becomes so great that it is difficult to handle in the system.

The overflow from the reactor comprises a rather dilute suspension of magnesium hydroxide crystals in spent sea water. A proportion of the overflow as described above is recycled to the incoming sea water line, where it dilutes the sea water with respect to the magnesium ion content and also provides a substantial proportion of the desired seed crystals. The remainder of the overflow goes to a thickener where the crystals settle to the bottom and are thence withdrawn, a proportion being recycled to the incoming sea water to provide seed crystals, as in the proportions described above, and the remainder going to one or more washing tanks in series where the thickened slurry is subjected to counter-current washing by a flow of fresh water. The washed and thickened slurry or sludge is then filtered, as by means of a rotary or other filter. The filter cake can be dried to provide magnesium hydroxide, or it can be calcined under varying conditions to provide magnesia of desired characteristics.

It is an advantage of the process of this invention that a well-crystallized, rapidly settling precipitate is formed. It is a further advantage that a thickened slurry of very high solids content is obtained and, therefore, washing in the later stages of the process is more efficient; and it is a still further advantage that, due to the improved crystalline characteristics of the precipitate, this thickened slurry is less viscous, can be handled more easily by the pumping system, filters very well and yields a filter cake of very high magnesium oxide content. Another advantage is that the filter cake going to the drier or calciner has a higher percentage of solids. It is an advantage in combining seeding and the addition of dry feed in this process, that the seed increases the viscosity of the liquid in the reaction zone and thereby decreases the settling rate of the feed reactant particles, enabling more complete reaction thereof per pass and yielding a denser settled mass which is also higher in impurities. Furthermore, a high purity product is obtained by the method of this invention.

The annexed drawings, of which Figure 1 is a flowsheet of one embodiment of the reaction process and Figure 2 is a schematic diagram of a suitable washing and thickening system, will aid in illustrating this invention.

In the flowsheet, Figure 1, incoming sea water, pre-treated in the usual manner to remove carbonates, is mixed in a mixing zone with seed crystals and a portion of the overflow from the reactor which is a relatively dilute suspension of $Mg(OH)_2$ crystals in spent sea water. Dry calcined dolomite is added to the mixture of incoming sea water, seed crystals and dilution liquor; and underflow, or settled calcine material as described, is recycled from the reactor to the incoming line, being added subsequently to the addition of fresh calcined dolomite feed, or prior to or simultaneously with the fresh calcine. The mixture containing added calcine feed goes to a reactor where it is well agitated, the overflow therefrom passing in part to the thickener and in part to the pre-mixing zone as above stated. In the thickener, the suspension of Mg(OH)₂ crystals in spent sea water is stirred and caused to settle. An amount of thickened slurry from the thickener is recycled to the mixing zone, as shown, to provide seed crystals or crystal surfaces. The remainder of the thickened slurry goes to a washing tank or series of washing tanks where it is washed with a counter-current flow of fresh water. The spent sea water overflow from the thickener goes to waste.

A suitable thickening, washing and filtering system is shown schematically in Figure 2.

In Figure 2, 10 is a pipe or conduit bringing a proportion of the overflow from the reactor into the thickener tank 11. The overflow, which is a relatively thin slurry of Mg(OH)₂ crystals in spent sea water falls into a spreader box 12, and spills over the top thereof into the main body of the thickener tank where it is kept in circular motion, aided also by rakes 13 which revolve slowly. The thickened slurry collects at the base of the tank and is drawn off as indicated by pipe 14 and pump 15. The overflow, which is spent sea water, is largely sent to waste but a minor proportion can be returned to the mixing zone to dilute the incoming sea water.

By means of pump 15, which is suitably a centrifugal pump, the thickened slurry is sent to wash tank 18 by way of pipe 16. Fresh water for washing is introduced at 17. The mixture rises through pipe 19 and flows into the main body of the tank where it is kept in circular motion, agitation being aided by slowly-revolving rake 20. The overflow goes to waste, and the washed and thickened slurry is drawn off by pipe 21 and pump 22, and goes to filter 24 by way of pipe 23. The filter is suitably a rotary filter. The filter cake obtained is sent to drier 25 where moisture is driven off and dry Mg(OH)₂ is obtained; or, alternately, it is sent to calciner 26 to obtain MgO.

The examples given below illustrate methods of carrying out this invention.

*Example 1*

Ocean water which has been subjected to the conventional sweetening, or pre-treatment step, to remove carbon dioxide and bicarbonates, is flowed to a mixing tank at the rate of 4 liters per minute and is there mixed with overflow from the reactor which enters at the rate of 4.25 liters per minute, carrying 116 grams per minute of magnesium hydroxide crystals, and with 0.49 liter per minute of underflow from the thickener, carrying 102.7 gms. per minute of magnesium hydroxide crystals. To the premixed material, as it flows to the reactor, is fed calcined dolomite as received from the calcining kiln, in an amount to react about 85% of the available magnesium ion; and then the underflow from the reactor is added to the mixture, being recycled thereto by means of suitable pipes and a centrifugal pump. The entire mixture then goes to a reaction tank where, besides the agitation effected by pumping and flow, further agitation is provided by a mixing rake in the reactor. The calcined dolomite has the following approximate screen analysis: 1.0% retained on .441 inch mesh, 7.0% passing .441 inch and retained on 4 mesh, 30.3% passing 4 mesh and retained on 14 mesh and 61.7% passing 14 mesh, with a minimum of fines.

The particles of calcine fall through the reacting liquid mixture and are withdrawn from the base thereof and sent back to the incoming stream. In this example, the rocks and siliceous material which are unreacted are removed from the base of the reactor once every 24 hours, and are sent to waste. The overflow from the reactor is in part returned to the incoming stream, in the amount stated above, and the remainder of the overflow is sent to the thickener tank where it is kept in slow circular motion and the magnesium hydroxide crystals settle to a thick slurry at the base, while the overflow of spent sea water is drawn off and discarded. After one day's settling the thick slurry contains from 260 to 275 grams per liter of magnesium hydroxide, corresponding to 180 to 190 grams per liter of magnesia; and after 5 days' settling, the thick slurry contains from 340 to 355 grams per liter of magnesium hydroxide, corresponding to 235 to 245 grams per liter of magnesia, or about 2 lbs. per gallon of magnesia.

The thickened slurry is subjected to counter-current washing with fresh water and is then filtered. The filter cake contains 51.6% by weight of magnesium hydroxide, corresponding to 35.7% by weight of magnesia. The magnesia obtained shows upon analysis, on the ignited basis, the following composition: 0.89% $SiO_2$, 0.27% $Fe_2O_3$, 0.10% $Al_2O_3$, 1.50% CaO and 97.24% MgO. It is to be understood in these analyses that the sesquioxides, for example, $Fe_2O_3$ and $Al_2O_3$, may be present in a combined state, for example, the alumina may be present as a calcium aluminate etc.

The calcined dolomite feed has the following average composition: 3.99% $SiO_2$, 0.31% $Fe_2O_3$, 0.52% $Al_2O_3$, 59.28% CaO and 35.90% MgO. Of 445.8 pounds of this material fed during a 9-day run of the process, 24.64 pounds (or 5.5%) are removed from the system as rejects and sent to waste, and this waste material shows the following average analysis: 27.71% $SiO_2$, 1.35% $Fe_2O_3$, 4.21% $Al_2O_3$, 40.00% CaO and 26.73% MgO. In the plant operation of this method, where the reactor is a tank 50 feet in diameter and 10 feet in average effective liquid depth and has an inverted cone-shaped bottom having a slope of about one-half inch per foot, it has been found advantageous to maintain the specific gravity of the rejects at less than about 1.40, or, preferably, at from 1.35 to 1.40. That is to say, in one method of working, when the specific gravity of the settled material withdrawn from the base of the reactor increases to above 1.40, the settled material is sent to waste until the specific gravity thereof decreases to below 1.40; and in another method of working, a portion of the settled material is continuously withdrawn to waste to maintain the specific gravity of the recycled material at less than 1.40. While this specific gravity has been found a useful measure with the reactor tank as described, a different specific gravity will be employed with equipment of a different design. For instance, a lower density material can be recycled in the system where the reactor tank base has a greater slope; or, with a lesser slope a higher density is maintained. The settled material being recycled is suitably maintained at as high specific gravity as can be conveniently handled by the equipment available.

*Example 2*

In a plant operation, where 5000 gallons per minute of sweetened sea water were flowing into the reactor, and where no pre-mixing of seed crystals or of spent sea water dilution liquor was practiced, the filter cake recovered contained an average of 32.7% $Mg(OH)_2$, or 22.6% $MgO$, over a typical month's run. In another month's run, carried out according to the procedure schematically shown in the drawings, where an average of 4600 gallons per minute of sweetened sea water are mixed with an average of 4000 gallons per minute of reactor overflow, containing an average of 23.4 grams per liter of $Mg(OH)_2$, and with 450 gallons per minute of underflow from the thickener, containing an average of 167.5 grams per liter of $Mg(OH)_2$, the filter cake recovered, after settling and washing the precipitate, contains an average of 49.8% $Mg(OH)_2$, corresponding to 34.4% $MgO$. In this run the sea water is treated with calcined dolomite of the sizes shown in Example 3. The seeding ration in this plant run according to the invention is about 9:1. The product obtained has, upon the ignited basis, the following composition: 1.17% $SiO_2$, 0.24% $Fe_2O_3$, 0.17% $Al_2O_3$, 0.98% $CaO$ and 97.44% $MgO$. In this operation the reactor underflow is sent to waste when its solids content rises to about 50%. After it is thus reduced to about 35% solids, recycling of the underflow is resumed.

*Example 3*

In another mode of operation, sea water is treated with calcined dolomite ground to a suitable size. Incoming sea water, at the rate of 3.0 liters per minute, is mixed with 6.5 liters per minute of overflow from the reactor, carrying 168.8 grams of magnesium hydroxide, and 0.51 liter per minute of thickener underflow, carrying 84.8 grams of magnesium hydroxide, and to this mixture is added ground calcined dolomite of a particle size to be substantially retained on a 200-mesh screen, except for a minor portion of fines, and a major proportion being between 35 and 100 mesh, the dolomite being added in an amount to react 85% of the available magnesium ion. This mixture is agitated in the reactor as in Example 1, and the overflow is withdrawn, part being recycled in the amount stated and part going to the thickener. The underflow of settled dolomite particles is returned to the reaction system, but is sent to waste when the silica content thereof increases to about 22%. The overflow from the reactor which goes to the thickener is settled in the usual manner, the overflow therefrom going to waste and the underflow returning in part to the reaction system as described, and the remainder going to the washing tank or tanks. This material, as it comes from the thickener, contains on an average 310 grams per liter of magnesium hydroxide, or 215 grams per liter of magnesia; and upon filtering, the filter cake contained 49.6% magnesium hydroxide, or 34.3% magnesia. The final product contains, on the ignited basis, 96.42% $MgO$, and none of the other constituents exceed 1.3% each.

It is an advantage of adding dry calcine that the magnesia recovered on the filter cake is consistently higher. In the above examples, for instance, it is necessary to drive off 1.8 tons water per ton of magnesia in Example 1, in order to recover the calcined $MgO$; 1.9 tons per ton magnesia in Example 2; and 1.92 tons per ton magnesia in Example 3. The addition of dry calcine effects a real saving in fuel and reduces the cost of the product considerably. The filtration characteristics are so improved by this method of operation, especially with dry calcine feed, that in a plant installation where dry calcined dolomite is being added, only one rotary filter, 18 feet in length by 14 feet in diameter, is required in the production of about 75 tons of magnesia per day, whereas 3 such filters were acquired for the same production rate when operating according to an earlier process not incorporating the features herein defined. Simultaneously with this advantage, the magnesia recovered is of high purity. It is also an advantage that the magnesium hydroxide sludge produced in this process is less viscous and easier to handle in the pumping system. It is particularly advantageous that a more impure dolomite can be used with good results, in operating with a kiln-run calcine, because the impurities are quickly and easily separated due to the fact that they are not ground finely. This also effects a considerable power saving because the impurities constitute the portion of the dolomitic rock which is harder and more resistant to comminution. The calcined dolomite itself, that is the $CaO.MgO$ constituent, is quite soft.

This invention comprises, therefore, diluting the sea water to be treated, particularly with respect to its magnesium ion content, admixing seed crystals therewith, preferably in the ratio of from 3:1 to 10:1 with respect to magnesium hydroxide produced in the reaction zone, adding dry calcined dolomite, classifying in the reactor the portion rich in impurities from the suspension of magnesium hydroxide, and recycling at least a portion of each classification fraction to the incoming stream.

The underflow from the reactor, which is enriched in impurities, particularly iron and aluminum compounds (for convenience, often reported in the analyses as the sesquioxides) and silica, can be recycled in its entirety to the incoming stream and withdrawn to waste at intervals when it becomes too heavy for handling or when its silica content, particularly, becomes too high, or a classification device can be inserted in the underflow line between the reaction zone and the point of entry into the incoming stream, whereby the fraction containing the major proportion of the impurities is continuously withdrawn to waste and the remaining fraction, containing largely unreacted dolomite, returned to the system. A particularly useful classification device for separating the desirable and undesirable portions of the underflow is the "cyclone" separator, a cone-shaped device where the feed enters at the upper portion and is whirled at great speed. The heavier portions work downwardly and are withdrawn at the base and sent to waste, and the lighter portions flow upwardly and are withdrawn at the central part of the top and are sent to the feed line. It is observed with this device that the portion thereby discarded comprises largely the major proportion of the unreactive calcium values, which probably are calcium aluminate and calcium silicates.

In the process of this invention the reaction of the sea water is effected very rapidly. By this process the average time of residence in the reactor is less than one-half hour, and is usually less than 15 minutes. For example, in the plant operation described above the rates of flow are such that the average time in the reactor is eleven minutes. In other tests carried out by the method of the invention the reaction time has been as low as two minutes.

Calcined dolomite which is particularly useful in this process is that which has been calcined to an active state, for instance at a temperature of around 1200° C. It is not fired to a sintered or dead-burned condition. An especially useful dolomite is one in which the siliceous impurities occur as discrete segregations and are not dispersed as fine particles throughout the mass of the dolomite.

In the specification and claims, all percentages are by weight unless otherwise indicated.

Having now described the invention, what is claimed is:

1. In a process for producing magnesium hydroxide which comprises the steps of introducing dilute magnesium salt-containing brine to a reaction system, adding calcined dolomite of particle size not less than that retained on 200 mesh screen to said dilute brine, agitating the mixture in a reaction zone, withdrawing from said agitated mixture as underflow a sludge enriched in impurities, withdrawing from said mixture as overflow reacted brine containing a suspension of magnesium hydroxide crystals, and flowing said reacted brine to a thickening zone, the improvement which comprises the steps of recycling to the reaction system a portion of said reacted brine in amount of from about one-half to about two times the volume of unreacted brine being introduced to the reaction system, and adding additional magnesium hydroxide crystals to the reaction system in amount sufficient to provide in the reaction zone a total magnesium hydroxide crystal content in proportion of from about 3 to about 15 times the weight of magnesium hydroxide being produced.

2. A process for producing magnesium hydroxide comprising the steps of mixing dilute magnesium salt-containing brine with dry calcined dolomite of particle size not less than that retained on 200 mesh screen, agitating the mixture, withdrawing as underflow from said mixture a sludge enriched in impurities, withdrawing as overflow from said mixture a suspension of magnesium hydroxide crystals in spent brine, recycling said suspension-containing brine in amount of from about one-half to about two times the amount of magnesium salt-containing brine being introduced to the reaction system, passing the remaining portion of said suspension to a thickening zone, and returning a portion of thickened crystals to the reaction system in amount sufficient to establish in the reaction zone magnesium hydroxide crystals in a ratio of from about 3 to about 15 times the weight of magnesium hydroxide being produced.

3. A process for producing magnesium hydroxide comprising the steps of mixing dilute magnesium salt-containing brine with dry calcined dolomite of particle size not less than that retained on 200 mesh screen, agitating the mixture, withdrawing as underflow from said mixture a sludge enriched in impurities, withdrawing as overflow from said mixture a suspension of magnesium hydroxide crystals in spent brine, recycling said suspension-containing brine in amount of from about one-half to about two times the amount of magnesium salt-containing brine being introduced to the reaction system, and adding finely divided naturally occurring magnesium hydroxide crystals to the reaction system in amount sufficient to establish in the reaction zone magnesium hydroxide crystals in a ratio of from about 3 to about 15 times the weight of magnesium hydroxide being produced.

4. A process for producing magnesium hydroxide comprising the steps of mixing dilute magnesium salt-containing brine with dry calcined dolomite of particle size not less than that retained on 200 mesh screen, agitating the mixture, withdrawing as underflow from said mixture a sludge enriched in impurities and containing unreacted dolomite particles, returning at least a portion of said sludge to said reaction zone, withdrawing as overflow from said mixture a suspension of magnesium hydroxide crystals in spent brine, recycling said suspension-containing brine in amount of from about one-half to about two times the amount of magnesium salt-containing brine being introduced to the reaction system, passing the remaining portion of said suspension to a thickening zone, and returning a portion of thickened crystals to the reaction system in amount sufficient to maintain in the reaction zone a total magnesium hydroxide crystal content in proportion of from about 3 to about 15 times the weight of magnesium hydroxide being produced in the reaction.

5. A process for producing magnesium hydroxide comprising the steps of admixing an incoming stream of sea water which has been treated to remove bicarbonates with dry calcined dolomite of particle size predominantly greater than 35 mesh screen, agitating the mixture, withdrawing as underflow from said mixture a sludge enriched in impurities and containing unreacted dolomite particles, returning at least a portion of said sludge to the reaction system, withdrawing as overflow from said mixture a suspension of magnesium hydroxide crystals in spent sea water, recycling said suspension in about equal volume to the volume of incoming sea water being introduced to the reaction system, passing the remaining portion of said suspension to a thickening zone, and returning a portion of thickened crystals to the reaction system in amount sufficient to establish in the reaction zone a total amount of magnesium hydroxide crystals in proportion of from about 3 to about 10 times the weight of magnesium hydroxide being produced in the reaction.

6. In a process for making magnesium hydroxide wherein incoming dilute magnesium salt-containing brine is reacted with dry calcined dolomite, a suspension of magnesium hydroxide crystals in spent brine is withdrawn from the reaction zone as overflow, a sludge enriched in impurities is withdrawn from the reaction zone as underflow, and said suspension of magnesium hydroxide crystals is thickened in a thickener, the steps comprising mixing with said incoming dilute brine spent brine in an amount of from about one-half to about two times the amount of said dilute brine being introduced to the reaction zone, and magnesium hydroxide crystals in an amount sufficient to maintain in the reaction zone magnesium hydroxide crystals in a ratio of from about 3 to about 15 times the weight of magnesium hydroxide being produced in the reaction, and admixing the said mixture of brine, recycled spent brine and crystals with dry calcined dolomite of particle size not less than that retained on 200 mesh.

7. In a process for making magnesium hydroxide wherein incoming dilute magnesium salt-containing brine is reacted with dry calcined dolomite, a suspension of magnesium hydroxide crystals in spent brine is withdrawn from the reaction zone as overflow, a sludge enriched in impurities is withdrawn from the reaction zone as underflow, and said suspension of magnesium hydroxide crystals is thickened in a thickener, the steps comprising recycling to said incoming dilute brine said withdrawn suspension of magnesium crystals in spent brine in an amount of from about one-half to about two times the amount of said dilute brine being introduced to the reaction zone, recycling a portion of the magnesium hydroxide crystals thickened in said thickener to said incoming dilute brine in an amount sufficient to maintain in the reaction zone magnesium hydroxide crystals in a ratio of from about 3 to about 15 times the weight of magnesium hydroxide being produced in the reaction, and admixing the said mixture of brine, recycled spent brine and crystals with dry calcined dolomite of particle size not less than that retained on 200 mesh.

8. In the process for making magnesium hydroxide wherein incoming dilute magnesium salt-containing brine is reacted with dry calcined dolomite, a suspension of magnesium hydroxide crystals in spent brine is withdrawn from the reaction zone as overflow, a sludge enriched in impurities is withdrawn from the reaction zone as underflow, at least a portion of said underflow is recycled to the reaction zone, and said suspension of magnesium hydroxide crystals is thickened in a thickener, the steps comprising recycling to said incoming dilute brine said withdrawn suspension of magnesium crystals in spent brine in an amount of from about one-half to about two times the amount of said dilute brine being introduced to the reaction zone, adding magnesium hydroxide crystals to said incoming dilute brine in an amount sufficient to maintain in the reaction zone magnesium hydroxide crystals in a ratio of from about 3 to about 15 times the weight of magnesium hydroxide being produced in the reaction, and admixing the said mixture of brine, recycled spent brine and crystals with dry calcined dolomite of particle size not less than that retained on 200 mesh.

9. A process for producing magnesium hydroxide which comprises the steps of mixing sea water with from about one-half to about two times its volume of previously reacted sea water, adding magnesium hydroxide crystals to the mixture in amount sufficient to establish therein a crystal ratio of from about 3 to about 15 times the weight of magnesium hydroxide being produced in the reaction, adding dry calcined dolomite of particle size not less than that retained on 200 mesh screen, agitating said mixture in a reaction zone while permitting said dolomite particles to settle through said mixture, withdrawing said settled dolomite particles as underflow, recycling at least a part of said underflow to the incoming mixture of sea water and crystals, withdrawing from said mixture as overflow a suspension of magnesium hydroxide crystals in spent sea water, a portion of such overflow being utilized as the aforementioned previously reacted sea water which is mixed with incoming sea water prior to reaction, and passing the remaining portion of said overflow to a thickening zone, a portion of the crystals thickened therein being utilized for the aforementioned crystal addition prior to reaction.

10. A process for producing magnesium hydroxide which comprises the steps of mixing incoming sea water, pre-treated to remove carbon dioxide and bicarbonates, with about an equal volume of previously reacted sea water, adding a thickened slurry of magnesium hydroxide crystals to the mixture in amount sufficient to establish therein a crystal ratio of from about 3 to about 10 times the weight of magnesium hydroxide being produced in the reaction, adding dry calcined dolomite of particle size predominantly greater than 35 mesh screen, agitating said mixture in a reaction zone while permitting said dolomite particles to settle through said mixture, maintaining said incoming sea water in contact with said dolomite particles for a total period of less than 30 minutes, withdrawing said settled dolomite particles as underflow, recycling at least a part of said underflow to the incoming mixture of sea water and crystals, and withdrawing from said mixture as overflow a suspension of magnesium hydroxide crystals in spent sea water, a portion of such overflow being utilized as the aforementioned previously reacted sea water which is mixed with incoming sea water prior to agitation.

11. In a process for producing magnesium hydroxide which comprises the steps of introducing dilute magnesium salt-containing brine to a reaction system, adding calcined dolomite of particle size not less than that retained on 200 mesh screen to said dilute brine, agitating the mixture in a reaction zone, withdrawing from said agitated mixture as underflow a sludge enriched in impurities, and withdrawing from said mixture as overflow reacted brine containing a suspension of magnesium hydroxide crystals, the improvement which comprises the steps of recycling to the reaction system a portion of said reacted brine in amount of from about one-half to about two times the volume of unreacted brine being introduced to the reaction system, and adding additional magnesium hydroxide crystals to the reaction system in amount sufficient to provide in the reaction zone a total magnesium hydroxide crystal content in proportion of from about 3 to about 15 times the weight of magnesium hydroxide being produced.

ARTHUR W. VETTEL.
ROBERT D. ISRAEL.

REFERENCES CITED

The following references are of record in the file of this patent:

UNITED STATES PATENTS

| Number | Name | Date |
|---|---|---|
| 1,505,202 | Judd | Aug. 19, 1924 |
| 2,124,002 | Martin | July 19, 1938 |
| 2,224,780 | Chesny | Dec. 10, 1940 |
| 2,281,477 | Chesny | Apr. 28, 1942 |
| 2,405,055 | Robinson | July 30, 1946 |
| 2,493,752 | DeMaestri | Jan. 10, 1950 |

OTHER REFERENCES

Chesny: "Magnesium Compounds from Ocean Water"; Ind. & Eng. Chemistry—April, 1936, pages 383–390.